US012413806B2

(12) United States Patent
Riedl et al.

(10) Patent No.: US 12,413,806 B2
(45) Date of Patent: *Sep. 9, 2025

(54) CONTENT DELIVERY NETWORK UTILIZING DYNAMICALLY ASSEMBLED ADAPTIVE BITRATES SEGMENTS

(71) Applicant: Pluto Inc., West Hollywood, CA (US)

(72) Inventors: Steven Ernest Riedl, Atlanta, GA (US); Spencer Shanson, Menlo Park, CA (US)

(73) Assignee: Pluto Inc., West Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,938

(22) Filed: Jun. 20, 2024

(65) Prior Publication Data

US 2024/0348860 A1    Oct. 17, 2024

Related U.S. Application Data

(63) Continuation of application No. 17/819,094, filed on Aug. 11, 2022, now Pat. No. 12,047,632.

(51) Int. Cl.
*H04N 21/43* (2011.01)
*H04N 19/40* (2014.01)
*H04N 21/2187* (2011.01)

(52) U.S. Cl.
CPC ....... *H04N 21/43072* (2020.08); *H04N 19/40* (2014.11); *H04N 21/2187* (2013.01)

(58) Field of Classification Search
None
See application file for complete search history.

(56) References Cited

U.S. PATENT DOCUMENTS 5,411,493 A    5/1995 Rodriguez
6,378,129 B1    4/2002 Zetts
(Continued)

FOREIGN PATENT DOCUMENTS

WO    WO 2011/106601 A2    9/2011
WO    WO 2020/012634 A1    6/2020
(Continued)

OTHER PUBLICATIONS

European Search Report regarding Application No. EP 20 20 5539, dated Feb. 18, 2021, 8 pages.
(Continued)

*Primary Examiner* — Omar S Parra
(74) *Attorney, Agent, or Firm* — Knobbe, Martens, Olson & Bear LLP

(57) ABSTRACT

An aspect of the disclosure related to methods and systems configured to detect that an item of streaming primary video content associated with a channel of scheduled streaming content is designated to be streamed to a device. Ancillary content is identified. Alternative versions of respective sections of the ancillary content are identified. Metadata corresponding to the alternative versions of ancillary content, metadata corresponding to the item of primary video content, and/or metadata corresponding to the channel are used in selecting a first section from among the alternative versions of a given section. The ancillary content, including the selected first section from among the alternative versions is streamed to the device immediately before, during, or immediately after the item of streaming video content. The alternative versions may be transcoded to generate multiple encoded iterations of respective alternative versions and the encoded versions are stored in a tree data structure.

23 Claims, 9 Drawing Sheets

(56) References Cited

U.S. PATENT DOCUMENTS

| | | |
|---|---|---|
| 6,423,047 B1 | 7/2002 | Webster |
| 6,625,811 B1 | 9/2003 | Kaneko |
| 6,982,780 B2 | 1/2006 | Morley |
| 8,005,826 B1 | 8/2011 | Sahami |
| 8,418,195 B1 | 4/2013 | Page |
| 8,483,393 B2 | 7/2013 | Robert |
| 8,533,761 B1 | 9/2013 | Sahami |
| 8,572,649 B1 | 10/2013 | Gossweiler, III |
| 8,578,042 B2 | 11/2013 | Hu |
| 8,631,440 B2 | 1/2014 | Gossweiler, III |
| 8,745,023 B2 | 6/2014 | Libin |
| 8,826,443 B1 | 9/2014 | Raman |
| 9,130,918 B2 | 9/2015 | Picconi |
| 9,258,589 B2 | 2/2016 | Grouf et al. |
| 9,301,020 B2 | 3/2016 | Sun |
| 9,584,874 B1 | 2/2017 | Farfas |
| 9,613,042 B1 | 4/2017 | Joseph |
| 9,699,515 B2 | 7/2017 | Grouf et al. |
| 9,712,884 B2 | 7/2017 | Grouf et al. |
| 9,998,787 B2 | 6/2018 | Grouf et al. |
| 10,104,445 B2 | 10/2018 | Patel |
| 10,231,018 B2 | 3/2019 | Grouf et al. |
| 10,327,037 B2 | 6/2019 | Shanson et al. |
| 10,356,447 B2 | 7/2019 | Shanson |
| 10,356,480 B2 | 7/2019 | Hou et al. |
| 10,560,746 B2 | 2/2020 | Grouf et al. |
| 10,681,431 B2 | 6/2020 | Levy |
| 10,715,848 B2 | 7/2020 | Hou |
| 10,820,066 B2 | 10/2020 | Caulfield |
| 10,902,474 B2 | 1/2021 | Lo |
| 10,931,990 B2 | 2/2021 | Hou |
| 10,939,168 B2 | 3/2021 | Hou |
| 10,965,966 B1 | 3/2021 | Wu |
| 11,178,433 B2 | 11/2021 | Hou |
| 11,265,604 B2 | 3/2022 | Hou |
| 11,395,038 B2 | 7/2022 | Grouf et al. |
| 11,425,437 B2 | 8/2022 | Hou |
| 11,463,741 B2 | 10/2022 | Hou |
| 2002/0038457 A1 | 3/2002 | Numata |
| 2002/0121273 A1 | 9/2002 | Nyilas |
| 2003/0212708 A1 | 11/2003 | Potrebic |
| 2004/0088737 A1 | 5/2004 | Donlan |
| 2004/0255328 A1 | 12/2004 | Baldwin et al. |
| 2006/0271959 A1 | 11/2006 | Jacoby |
| 2007/0294710 A1 | 12/2007 | Meesseman |
| 2007/0294734 A1 | 12/2007 | Arsenault |
| 2008/0114880 A1 | 5/2008 | Jogand-Coulomb |
| 2008/0194276 A1 | 8/2008 | Lin |
| 2008/0235733 A1 | 9/2008 | Heie |
| 2008/0270462 A1 | 10/2008 | Thomsen |
| 2008/0271078 A1 | 10/2008 | Gossweiler |
| 2008/0271080 A1 | 10/2008 | Gossweiler |
| 2009/0070819 A1 | 3/2009 | Gajda |
| 2009/0133090 A1 | 5/2009 | Busse |
| 2010/0021512 A1 | 1/2010 | Arron |
| 2010/0138297 A1 | 6/2010 | Fitzgerald |
| 2010/0138298 A1 | 6/2010 | Fitzgerald |
| 2010/0299264 A1 | 11/2010 | Berger |
| 2010/0325657 A1 | 12/2010 | Sellers |
| 2011/0126251 A1 | 5/2011 | LaFreniere |
| 2011/0126258 A1 | 5/2011 | Emerson |
| 2011/0296048 A1 | 12/2011 | Knox |
| 2012/0110621 A1 | 5/2012 | Gossweiler, III |
| 2012/0174157 A1 | 7/2012 | Stinson, III |
| 2012/0192232 A1 | 7/2012 | Ellis |
| 2012/0198492 A1 | 8/2012 | Dhruv et al. |
| 2012/0272264 A1 | 10/2012 | Suzuki |
| 2013/0170818 A1 | 7/2013 | Klappert |
| 2013/0175333 A1 | 7/2013 | Gilbert |
| 2013/0198642 A1 | 8/2013 | Carney |
| 2013/0305287 A1 | 11/2013 | Wong |
| 2014/0150019 A1 | 5/2014 | Ma et al. |
| 2014/0157312 A1 | 6/2014 | Williams |
| 2014/0189743 A1 | 7/2014 | Kennedy |
| 2014/0245351 A1 | 8/2014 | Ford |
| 2014/0280883 A1 | 9/2014 | Pieczul et al. |
| 2014/0351843 A1 | 11/2014 | Theriault |
| 2014/0366068 A1 | 12/2014 | Burkitt |
| 2014/0373041 A1 | 12/2014 | Yan |
| 2015/0382042 A1 | 12/2015 | Wagenaar |
| 2017/0041372 A1 | 2/2017 | Hosur |
| 2020/0084486 A1 | 3/2020 | Cho |
| 2020/0204849 A1 * | 6/2020 | Loheide ............ H04N 21/2187 |
| 2021/0006848 A1 | 1/2021 | Haritaoglu et al. |
| 2021/0092467 A1 | 3/2021 | Schwimmer et al. |
| 2021/0144426 A1 | 5/2021 | Navarre et al. |
| 2021/0201349 A1 | 7/2021 | Singh et al. |
| 2022/0046302 A1 | 2/2022 | Shanson et al. |
| 2022/0086532 A1 | 3/2022 | Major |
| 2022/0150562 A1 | 5/2022 | Steinberg et al. |
| 2022/0295147 A1 | 9/2022 | Grouf et al. |
| 2022/0303623 A1 | 9/2022 | Grouf et al. |

FOREIGN PATENT DOCUMENTS

| | | | | |
|---|---|---|---|---|
| WO | WO-2020126341 A1 * | 6/2020 | ......... | G06Q 30/0277 |
| WO | WO-2020231431 A1 * | 11/2020 | ............ | G06N 20/00 |

OTHER PUBLICATIONS

International Search Report and Written Opinion dated Oct. 6, 2023, received in International Patent Application No. PCT/2023/068355, in 9 pages.

* cited by examiner

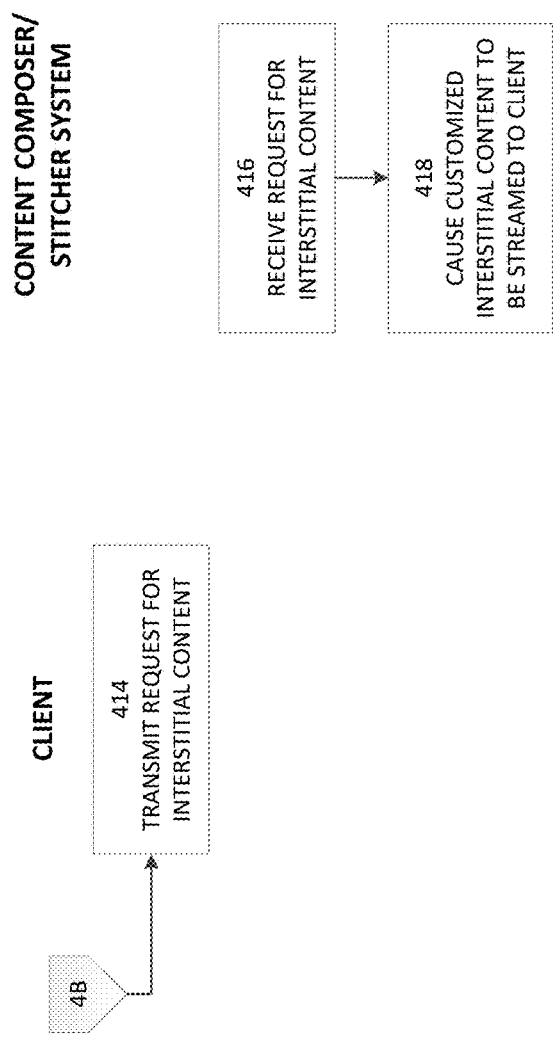

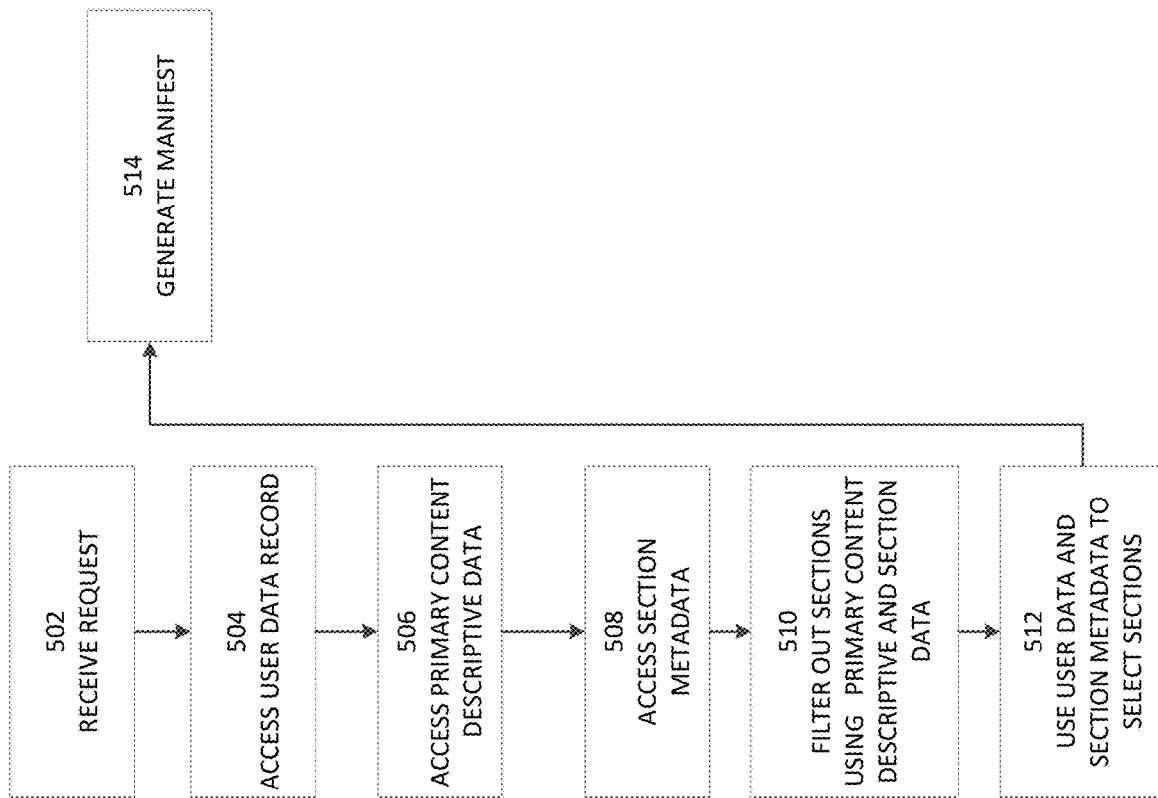

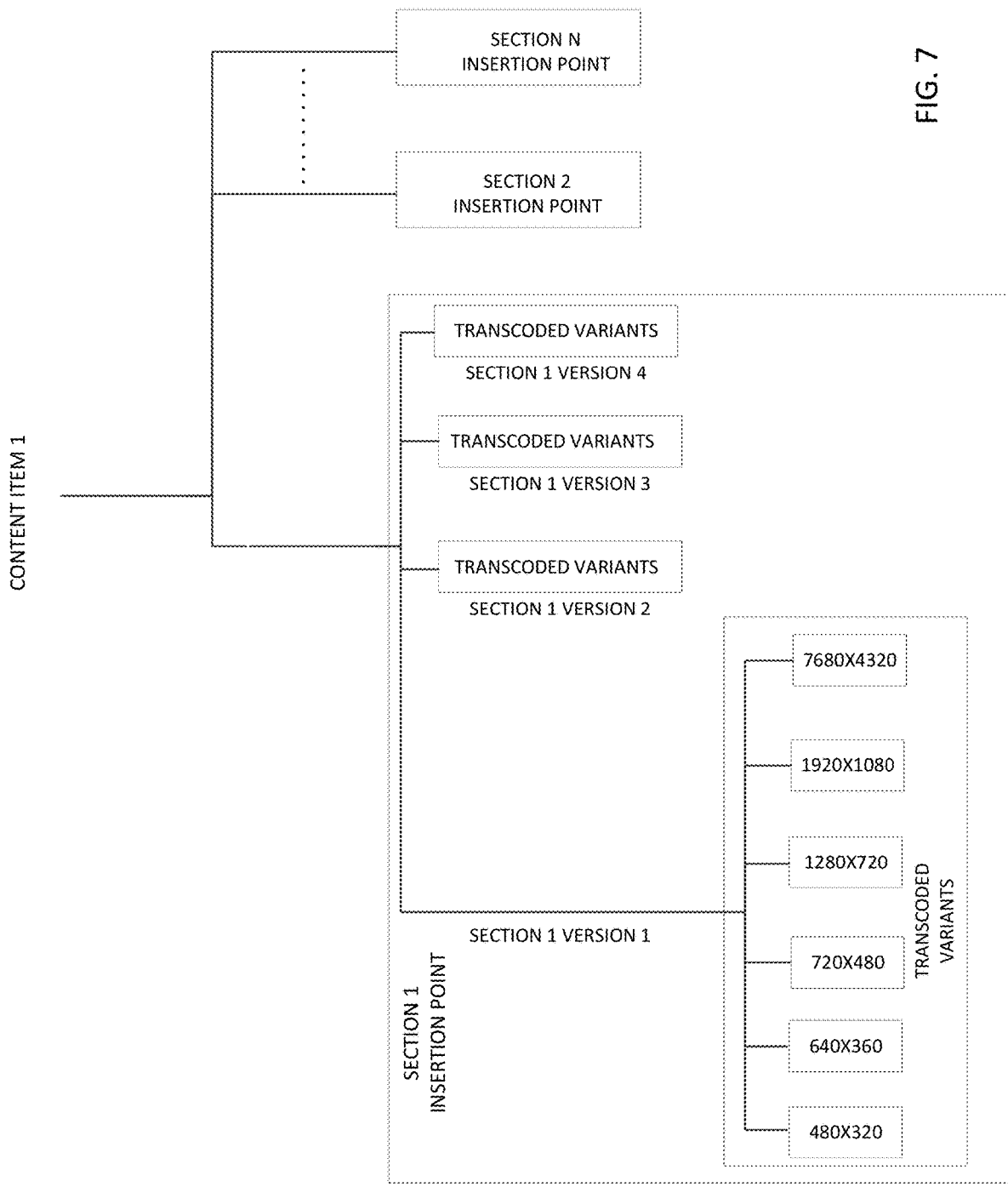

CONTENT DELIVERY NETWORK UTILIZING DYNAMICALLY ASSEMBLED ADAPTIVE BITRATES SEGMENTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention is related to video players and in particular to routing video content to video players over a network.

Description of the Related Art

Items of video content from multiple sources may be routed over a network, such as the Internet, to a video player. For example, the video content may be routed using a content distribution system.

BRIEF DESCRIPTION OF THE DRAWINGS

FIGS. 3-5 illustrate example processes.
FIG. 7 illustrates an example data structure.

Figure 1:
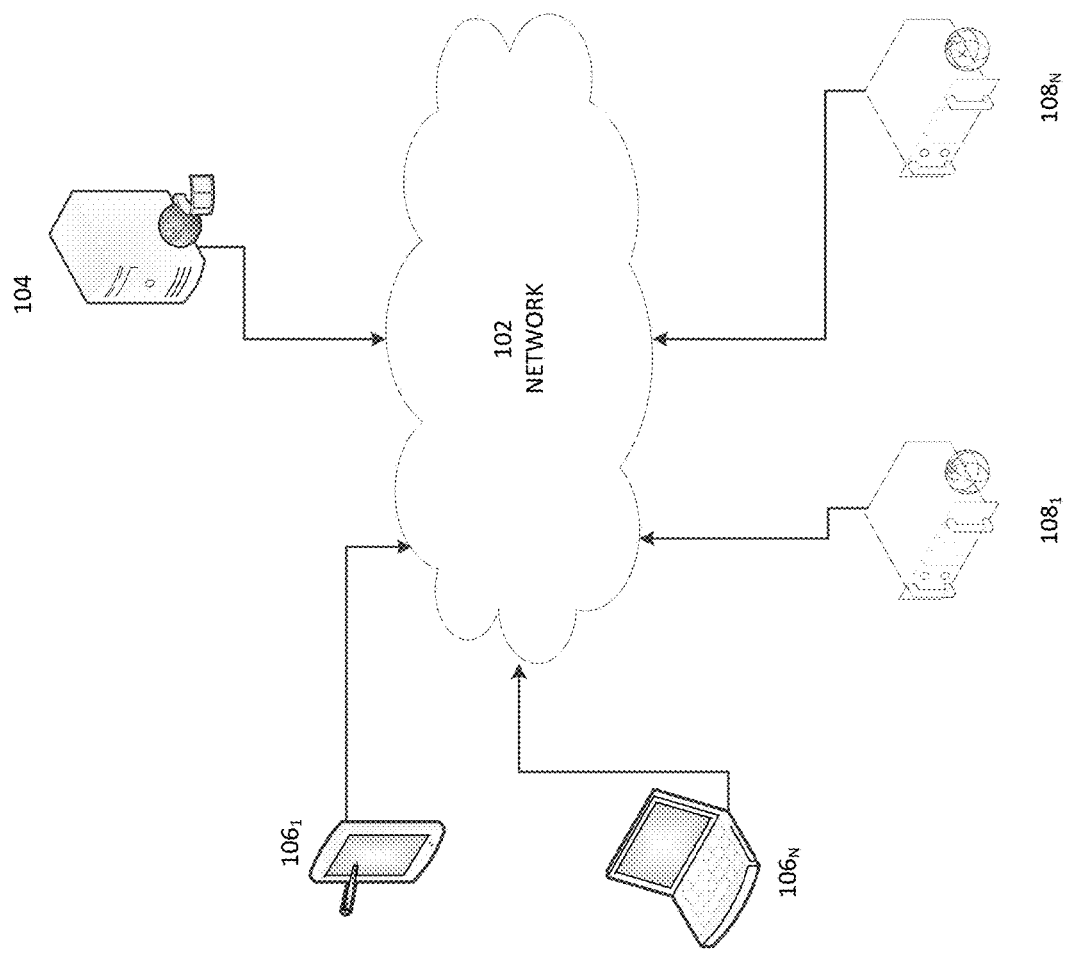
FIG. 1 illustrates an example environment.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

Methods and systems are described configured to distribute streaming content over a network, such as the Internet, to client devices. Such content may include on-demand content and/or real time content (e.g., real time sporting events, news, concerts, and/or the like).

In certain environments, it may be desirable to deliver customized or directed (e.g., targeted) content to a user. Such customized or directed content may be in the form of ancillary content, such as interstitials. By way of non-limiting example, ancillary content may be in the form of content recommendations, interactive puzzles, or advertisements. Such interstitial ancillary content may be presented between items of primary content (e.g., TV shows, movies, sporting events, concerts, etc.) and/or between segments of primary content. Conventional techniques to provide such customized content may be to generate a large number of versions of a given item of interstitial content, where each version is altered to include some different content so as to be of more interest to a given viewer or set of viewers.

Disadvantageously, this approach utilizes vast amounts of computer resources, such as computer memory to store the large number of versions of a given item of content. Further, each version needs to be transcoded, where file format, the video, and the audio are converted to a format suitable for a given target client device. For example, a video transcoder may generate multiple video resolutions from an original higher-resolution video file (e.g., HD, 4K or 8K), where videos are transcoded into several lower resolution versions to provide video players multiple options to choose from for adaptive bitrate streaming. By way of illustration, transcoding may create a set of time-aligned video streams, each with a different bitrate and frame size. Such transcoding may consume large amounts of computer processor bandwidth in addition to the large amounts of memory needed to store the output of the transcoding process.

The disadvantages of conventional technical techniques are further exacerbated with the use of adaptive bitrates streaming technology, where the source content is encoded at multiple bitrates for video streaming over HTTP to accommodate fluctuations in network bandwidth. Each of the different bitrates streams may be segmented into multi-second parts (e.g., 2-10 second segments). A manifest file is generated and downloaded to the client player that describes the available stream segments and their corresponding bitrates. During stream start-up, the client may optionally request segments at the lowest available bitrates stream. If the client determines that the network throughput is greater than the bitrates of the streamed low bitrates segment, the client may request a higher bitrates segment of higher quality. If the client later determines that the network throughput has degraded, the client may adaptively request a lower bitrates segment of lower quality. Thus, the client may execute an adaptive bitrate algorithm that determines which bitrates segments to request, based at least in part on the current performance of the network.

Although adaptive bitrates streaming offers the advantage of providing the highest quality transcoded version to the client player that is possible given the current network state and available bandwidth, it requires storage memory for each transcoded version of each segment.

Further, certain conventional techniques for providing customized advertising content may download multiple alternative content sections to a set top box, and the set top box then selects and assembles two or more content sections into a customized advertisement for the set top box user based on the user's profile stored on the set top box. However, this approach further increases the required memory to provide such customized content as each set top box requires memory to store all the possible alternative sections for each customized advertisement even if many of those sections are never used by a given set top box.

Described herein are technical solutions that overcome some or all of the technical disadvantages of the conventional approaches described above. A backend system may store and/or access sections of an item of video content (including alternative sections) and/or associated audio content, such as an advertisement. Certain sections may be selected and presented in the alternative at a given insertion point/time and certain sections may be common to all viewers of the content item. Thus, two users viewing the same item of primary content at the same time may view alternative versions of the same interstitial content at the same time.

For example, insertion points for a given item of interstitial content may be spaced at regular intervals (e.g., every 2-10 seconds) or irregular intervals (e.g., at 5 seconds, 15 seconds, 25 seconds). The insertion points may optionally be spaced apart to equal the length of an adaptive bitrates segment time length. Video sections for a given item of interstitial content may correspondingly be all of the same time length (e.g., 5 seconds) or of different sizes (e.g., 5 seconds, 8 seconds, 10 seconds, etc.). The sections may be of the same length as an adaptive bitrates segment length or an integer multiple of an adaptive bitrates segment length.

The length of a given interstitial content item may correspond to a slot defined in an ad break (where an ad break may include one or more time slots into which advertisements are to be inserted). For example, an ad break is typically 15, 30 or 60 seconds long, although other slot time lengths may be used.

An automated content composer may be configured to select, for a given content item, sections from a set of alternative sections assigned to or otherwise associated with a given insertion point of a given interstitial content item. The content composer may use one or more items of data to select a given section for a given insertion point. For example, data regarding a user associated with a device to which the given interstitial content item is to be streamed may be used to select a given section (or a set of sections) for a given insertion point (or set of insertion points).

For example, user data may include some or all of the following user information: a given user's demographics (e.g., gender identification, age, marital status, number of children, geolocation, type of home, education level, income level, etc.), a given user's historical viewing history (e.g., which channels and programs the user has watched, how often the user watches a given channel or program, how long a user watches a given program or channel, etc.), how new a given user is as a user of the streaming service, how frequently or how many episodes of a given program series the user has viewed, expressly specified or inferred user preferences (e.g., genre, program, subject matter, content and/or channel likes and/or dislikes; user specifications of channels to be blocked; user reminder instructions regarding a given program; user bookmarks of a given program; other user preferences discussed herein; and/or the like), user navigation history (e.g., whether the user navigated away from an item of primary or ancillary content directed to a given subject matter (e.g., a given genre, or if the ancillary content is an ad, a given brand or subject matter), fast forwarded through an item of primary or ancillary content directed to a given subject matter, skipped an item of primary or ancillary content directed to a given subject matter, replayed an item of primary or ancillary content directed to a given subject matter (e.g., travel, clothing, jewelry, electronics, food, medical products, etc.), interacted with an item of primary or ancillary content directed to a given subject matter (e.g., clicked on a link in an item of content, responded to a question or quiz posed by item of content, played a game provided by an item of content, and/or the like), and/or other criteria. Optionally, certain personally identifying data or other personal data may not be stored or used to enhance privacy.

In addition or instead, metadata associated with an item of interstitial content, metadata associated with respective alternative sections of the item of interstitial content, and/or metadata associated with sets of alternative sections of the item of interstitial content (e.g., where a set may include two or more sequential or non-sequential sections, such as a set including a first section and a last section of the item of interstitial content) may be used to select a given section (or a set of sections) for a given insertion point (or set of insertion points) of an item of interstitial content. By way of example, the metadata may include desired or prohibited viewer demographics (such as some or all of the demographic characteristics described herein for a given section or set of sections). In addition or instead, the metadata may specify other desired or prohibited user characteristics described herein (such as user subject matter interests, preferences, viewing history, navigation history, and/or other user data described herein).

In addition or instead, metadata associated with primary content (and/or a streaming channel via which the program content is streamed) a user is currently viewing may be used to select a given section (or a set of sections) for a given insertion point (or set of insertion points) of an item of interstitial content. For example, the primary content and/or channel metadata may indicate an associated age-appropriateness rating or include content descriptions (e.g., suitable for children, suitable for ages 13 and up, suitable for ages 17 and up, suitable for ages 18 and up, contains violence, nudity, obscene language, mature situations, etc.), title, category, genre (e.g., preschool content, children, adventure, comedy, crime, mystery, police procedural, fantasy, historical, horror, romance, science fiction, animation, comic adaptation, etc.), viewer approval rating (e.g., 1, 2, 3, 4, or 5 stars), products or services depicted in the primary content, actors in the primary content, teams or players in the primary content (where the primary content may be a sports event), length, and/or other data.

Optionally, user data, interstitial/interstitial section metadata, and/or primary content (including primary content channel metadata) may be used by the content composer system to select sections from set of alternative sections to insert at a given interstitial insertion point.

For example, if the interstitial content is a travel advertisement for a specific destination, there may be alternative sections that identify the origin point. An insertion point may be specified via a corresponding user interface for the origin point content section. The user's location may be accessed from the user record or via the user device's IP address. Each of the alternative sections may be associated with metadata identifying the corresponding origin location. The content composer system may identify the origin point content section that most closely matches the user's location (e.g., using a geographic information system (GIS)), and select the identified origin point content section for insertion. Optionally, one of the alternative sections may be a default section that may be selected for insertion when the user's location cannot be determined or if there are no origin point content sections that sufficiently match the user's location (e.g., are not within a certain distance of one of the origin points corresponding to the origin point content sections). By way of further example, there may be alternative sections that depict activities that may be performed at the destination (e.g., dancing, lounging at the pool, family frolicking at the beach). If the primary content is associated with metadata that indicates it is a children's program, the content composer system may select the activity section that depicts family frolicking at the beach for insertion at a specified activities section insertion point.

The various selected sections may be associated with respective locators (e.g., URLs). The locators may be packaged as a manifest (e.g., a M3U8 playlist manifest), which may be provided to the client player hosted or accessed by the user device. The user device may then, at the appropriate interstitial slot, request the interstitial sections. The interstitial sections may then be accessed from memory and streamed to the client player in the appropriate sequence.

Optionally, the HTTP Live Streaming (HLS) communications protocol may be utilized for streaming video content. Examples of browsers that include an HLS video player include, without limitation, the Safari web browser, the Chrome browser with an HLS plugin, the Microsoft Edge browser, and the like. HLS employs the MPEG-2 Transport Stream (MP2TS).

The HLS protocol breaks a video overall stream into a sequence of relatively small HTTP-based file downloads (e.g., .ts files that include 5 seconds, 10 seconds, or other length of video content). At the start of the streaming session, an extended M3U8 playlist manifest is downloaded to the video player. The playlist manifest contains respective metadata for the various sub-streams. For example, an HLS playlist manifest file may comprise a list of video files to be played in sequence.

A manifest file manipulation "stitcher" system (whose functionality may optionally be provided by the content composer system) assembles a playlist that defines a linear sequence of individual clips, interstitials, and/or other content. The playlist effectively stitches the variety of media items into a continuous video stream during playback. If the HLS protocol is being used, the stitcher system may make this stream available to video players (e.g., hosted on remote user devices) through a URL that returns a HLS .m3u8 file. The receiving video player may access and play each item of content in the defined order. The video player may be embedded in a webpage, may be a dedicated video player application ("app"), or may be part of a larger app (e.g., a game app). It is understood that, while certain examples will be described with respect to the HLS protocol, other protocols, such as by way of example the MPEG DASH protocol, may be used. MPEG DASH (Dynamic Adaptive Streaming over HTTP) is a standard for adaptive streaming over HTTP. Similar to the HLS protocol, the MPEG DASH protocol generates and provides manifest files that identify the streams for the player and contain their respective URL addresses.

Thus, a stitching service provided by a stitcher system server (which may optionally be part of the content composer system) may be utilized which stitches various items of video content to define a stream of content. The stitched video content may include primary content (e.g., a program, a movie, or the like) and supplemental content (e.g., interstitial content, such as an advertisement, public service announcement, quiz, program information, etc.).

By way of example, if the primary video content (e.g., a movie) is being streamed for playback as video on demand video content, the stitcher system may include indicators in the manifest file indicating where respective items of interstitial content are to be played. The entire manifest file, including indications of interstitial locations may be transmitted over a network to a video player hosted on the user device at the beginning of the streaming of the video content. Thus, for VOD sessions, the client video player may optionally be provided full access to the entire program with a single manifest file. The manifest file may include locators for each interstitial section or a locator for an entire customized interstitial stored on a remote server.

Optionally, in order to conserve memory, once a customized interstitial is streamed from the remote server to the client on the user device, the customized interstitial may be deleted from memory.

Certain example aspects will now be discussed with reference to the figures. FIG. 1 illustrates an example environment. A content composer system 104 (which may include a stitcher component, such as a server, providing stitcher services or where a stitcher system may include a content composer component, or where the content composer and the stitcher may be independent systems) is connected to a network 102. The content composer system 104 is configured to communicate with client devices $106_1 \ldots 106_a$ that comprise video players. By way of example, the video player may be embedded in a webpage, may be a dedicated video player application, or may be part of a larger app (e.g., a game application, a word processing application, etc.). For example, as described elsewhere herein, the content composer system 104 may receive a request for media from a given client device 106 in the form of a request for a playlist manifest or updates to a playlist manifest. The content composer system 104 may identify, from a file, the location and length of an interstitial pod (a time frame reserved for interstitials, wherein one or more interstitials may be needed to fill a pod), determine context information (e.g., information regarding the primary content being requested, information regarding the user, and/or other context information), solicit and select interstitial content from third parties, define customized interstitials as described herein, generate playlist manifests, and/or perform other functions described herein. The content composer system 104 and/or another system may stream requested content to the requesting device 106.

Optionally, the content composer system 104 may transmit context information to one or more interstitial source systems $108_1 \ldots 108_n$. For example, the source systems $108_1 \ldots 108_n$ may optionally include ad servers, and the interstitial content may comprise ads. The interstitial source systems $108_1 \ldots 108_n$ may comply with the VAST protocol. By way of further example, the interstitial source systems $108_1 \ldots 108_n$ may provide public service videos, previews of upcoming programs, quizzes, news, games, and/or other content. The interstitial source systems $108_1 \ldots 108_n$ may use the context information in determining what interstitial content is to be provided or offered to the requesting client device 106. Optionally, the interstitial source systems $108_1 \ldots 108_n$ may submit bids to place interstitial content in association with primary content, and the content composer system 104 may evaluate the bids and optionally based at least in part on the bids, select one or more items to insert into an interstitial pod.

Figure 2A:
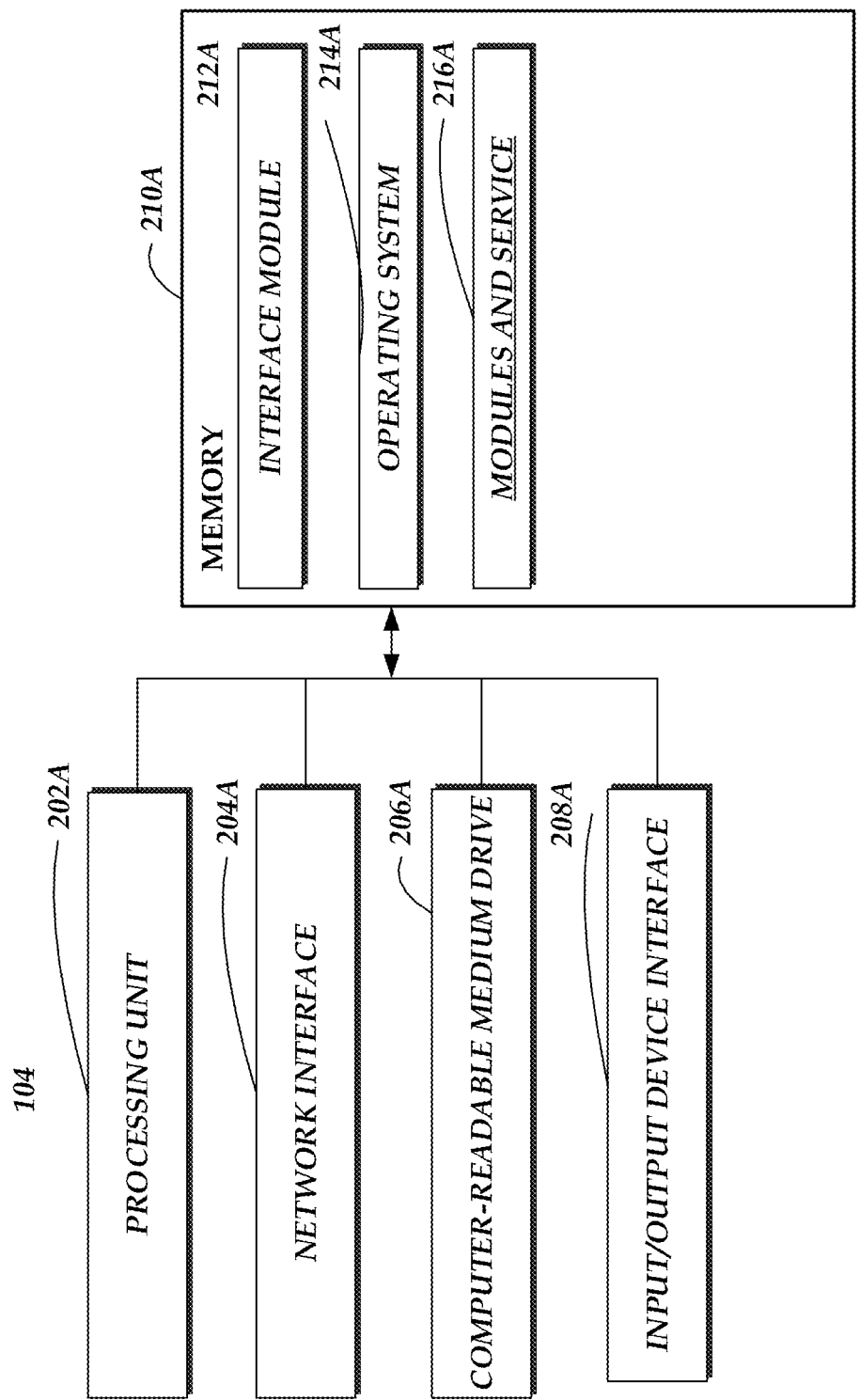
FIG. 2A is a block diagram illustrating example components.

FIG. 2A is a block diagram illustrating example components of a content composer system 104. The example content composer system 104 includes an arrangement of computer hardware and software components that may be used to implement aspects of the present disclosure. Those skilled in the art will appreciate that the example components may include more (or fewer) components than those depicted in FIG. 2A.

The content composer system 104 may include one or more processing units 202A (e.g., a general purpose processor, an encryption processor, a video transcoder, and/or a high speed graphics processor), one or more network interfaces 204A, a non-transitory computer-readable medium drive 206A, and an input/output device interface 208A, all of which may communicate with one another by way of one or more communication buses. The network interface 204A may provide the various services described herein with connectivity to one or more networks or computing systems. The processing unit 202A may thus receive information and instructions from other computing devices, systems, or services via a network. The processing unit 202A may also communicate to and from non-transitory computer-readable medium drive 206A and memory 210A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute in order to implement one or more embodiments of the present disclosure. The memory 210A generally includes RAM, ROM and/or other persistent or non-transitory computer-readable storage media. The memory 210A may store an operating system 214A that provides computer program instructions for use by the processing unit 202A in the general administration and operation of the modules and services 216A, including its components. The modules and services 216A are further discussed with respect to FIG. 2B and elsewhere herein. The memory 210A may further include other information for implementing aspects of the present disclosure.

In an example embodiment, the memory 210A includes an interface module 212A. The interface module 212A can be configured to facilitate generating one or more interfaces through which a compatible computing device may send to, or receive from, the modules and services 216A.

Figure 2B:
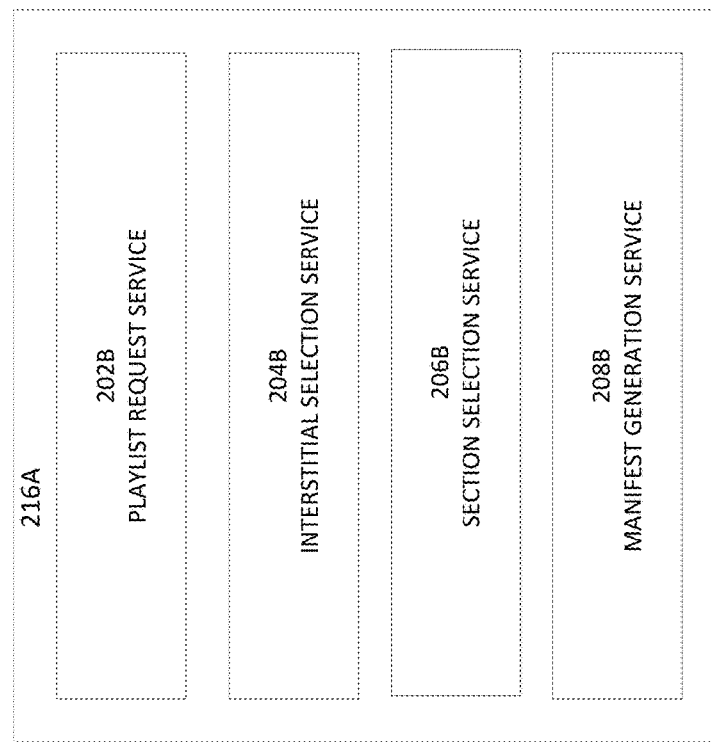
FIG. 2B illustrates example modules and services.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include a general purpose processor and may optionally include a video codec. The system 104 may offload certain compute-intensive portions of the modules and services 216A (e.g., transcoding and/or transrating a stream for adaptive bitrate operations, compositing, and/or the like) to one or more dedicated devices, such as a video codec (e.g., H.264 encoders and decoders), while other code may run on a general purpose processor. The system 104 may optionally be configured to support multiple streaming protocols, may provide low latency pass-through, and may support a large number of parallel streams (e.g., HD, 4K, and/or 8K streams). The processing unit 202A may include hundreds or thousands of core processors configured to process tasks in parallel. A GPU may include high speed memory dedicated for graphics processing tasks. As another example, the system 104 and its components can be implemented by network servers, application servers, database servers, combinations of the same, or the like, configured to facilitate data transmission to and from data stores, user terminals, and third party systems via one or more networks. Accordingly, the depictions of the modules are illustrative in nature.

Referring to FIG. 2B the modules and services 216A may include modules that provide a playlist request service 202B, an interstitial selection service 204B (which may also select sections to create a customized interstitial), and a playlist manifest generation service 208B.

The playlist request service 202B may receive and process requests for playlist manifests. The interstitial selection service 204B may assemble content information for a given interstitial pod (e.g., the length of the interstitial pod, the subject matter of requested primary content, information regarding a channel the viewer is watching, the content of a scene in which the interstitial pod is located, etc.) and transmit the information to one or more interstitial source systems. The interstitial source systems may propose interstitial content to the interstitial selection service 204B of the stitching system. The interstitial selection service 204B may evaluate the proposals and select one or more items of interstitial content for inclusion in the interstitial pod.

The section selection service 206B may select sections, among alternative sections, for various insertion points of an interstitial. For example, the section selection service 206B may access from memory and use user data, interstitial/interstitial section metadata, and/or primary content (including primary content channel metadata) to select sections from set of alternative sections to insert at a given interstitial insertion point. The section selection service 206B may be used to perform some or all states of processes described herein.

=The manifest generation service 208B may be used to assemble a playlist manifest (e.g., an HLS or MPEG DASH manifest) including locators (e.g., URLs) pointing to segments and sections of primary and interstitial content and locators (e.g., URLs), organized to correspond to the desired playback sequence. The manifest may be transmitted to a client on a user device. The client may then request a given item of content (e.g., section or segment) as needed, which may then be served by the corresponding content source or intermediary to the client.

Figure 3:
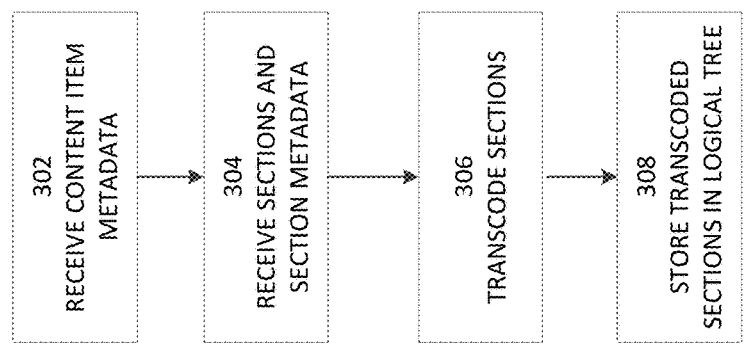

FIG. 3 illustrates an example process. The process may optionally be implemented using the example systems and components described elsewhere herein (e.g., content composer system 104 and some or all of the components therein).

At block 302, content item metadata is received and stored in memory. For example, the content metadata may optionally be for interstitial content as described herein. The content metadata may include, by way of example, an identifier (e.g., a unique alphanumeric identifier and/or a title), desired or prohibited viewer demographics (such as some or all of the demographic characteristics described herein. In addition or instead, the metadata may specify other desired or prohibited user characteristics described herein (such as user subject matter interests, preferences, viewing history, navigation history, and/or other user data described herein). The content metadata may be received from the content provider and may be entered by a system user.

At block 304, content metadata and optionally the content sections are received. As discussed herein, there may be multiple alternative content sections for a given portion of the content. The content section metadata may include some or all of the following: a section identifier (e.g., a unique alphanumeric identifier), an identifier of the associated content item (e.g., the interstitial in which the section may be used), a corresponding content item insertion point (where in the content item the section is to be used if selected for use), desired or prohibited viewer demographics (such as some or all of the demographic characteristics described herein), other desired or prohibited user characteristics described herein (such as user subject matter interests, preferences, viewing history, navigation history, and/or other user data described herein), age-appropriateness rating and/or section content description (e.g., suitable for children, suitable for ages 13 and up, suitable for ages 17 and up, suitable for ages 18 and up, contains violence, nudity, obscene language, mature situations, etc.), and/or other metadata described herein.

At block 306, the content item sections are transcoded. For example, the file format, the section video, and the section audio may be converted to multiple formats suitable for respective target client devices. For example, a video transcoder may generate multiple video resolutions from an original higher-resolution video file (e.g., HD, 4K or 8K), where videos are transcoded into several lower resolution version to provide video players multiple options to choose from for adaptive bitrate streaming (e.g., with different bitrates and frame sizes).

Figure 4A:
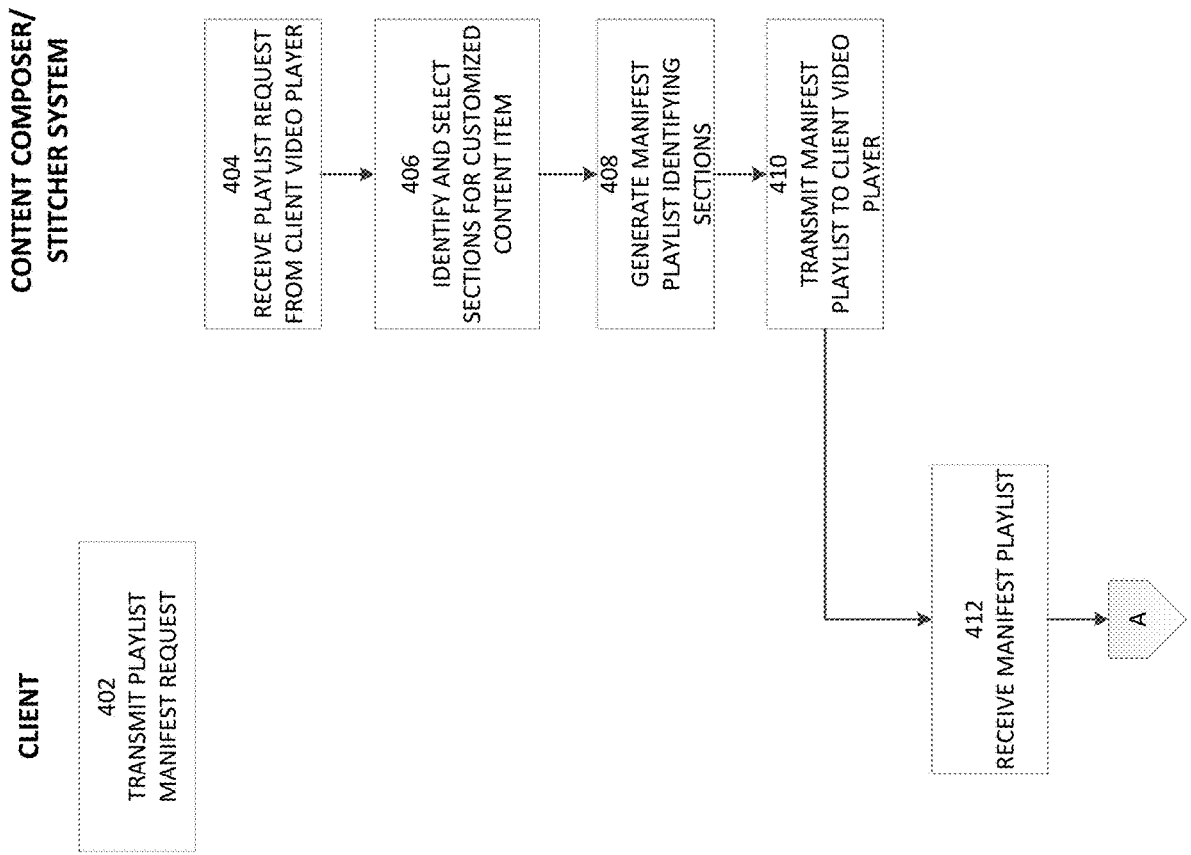

At block 308 the transcoded sections are stored in memory for streaming to client devices. The transcoded sections may optionally be stored in a tree data structure. The tree may be a non-linear and hierarchical data structure that is a collection of multiple nodes connected by edges. The tree is an abstract data type following a hierarchical pattern of data collection. For example, with reference to FIG. 7, a given content item may include branches for respective section insertion points (Section 1 insertion point, Section 2 insertion point, . . . Section N insertion point). Each section insertion point may in turn have branches for each alternative version of the section content (if there are alternative versions). Each section version branch may in turn have leaves corresponding to transcoded variants (e.g., 480×320, 640×360, 720×480, 1280×720, 1920×1080, 7680×4320, etc.). The tree data structure may be implemented in an SQL database, a non-SQL database, or a graph database (which may provide improved performance if there are a large number of hierarchy nodes), by way of example. The tree data structure may provide a relatively faster response to search queries, faster section access, and faster insertion and deletions than linked lists and arrays (where the access time increases as the size of the data set increases). Further, the tree data structure provides a hierarchical way of storing data that reflects the structural relationship in the content item data set, FIGS. 4A and 4B illustrate an example process that includes selection of sections from a set of alternative sections for respective insertion points for a content item (e.g., an interstitial content item).

At block 402, a request for a playlist manifest (e.g., an HLS .m3u8 or an MPEG DASH .mpd manifest file) is transmitted (e.g., by a stitcher system) over a network (e.g., a wired or wireless network) by a client video player on a user device. The request may be for an item of primary content, such as a movie, program, or live sporting event or other content item. The request or other communication may identify user device characteristics such as device manufacturer, device model, display size (e.g., display height and width in pixels), device height/width ratio, device operating system, and/or other information.

The request for an item of content (and hence the playlist manifest) may have been triggered by the user manually clicking on a play control or the request may have been automatically issued by an application. For example, if the user has completed playing a first movie (or other content), an application (e.g., such as that described in U.S. Pat. No. 9,258,589, titled "METHODS AND SYSTEMS FOR GENERATING AND PROVIDING PROGRAM GUIDES AND CONTENT," issued Feb. 9, 2016, and/or U.S. application Ser. No. 15/635,764, titled "METHODS AND SYSTEMS FOR GENERATING AND PROVIDING PROGRAM GUIDES AND CONTENT," filed Jun. 28, 2017, the contents of which are incorporated by reference in their entirety) may automatically request a manifest for the next scheduled item of primary content.

The next scheduled primary content item may be scheduled in accordance with a program guide, where the program guide may include multiple channels (e.g., corresponding to different subject matters), where a given channel has associated programs (e.g., movies, programs, live sporting events, or other items of content) with scheduled start and end times. Thus, for example, a manifest for an item of primary content may be automatically requested based at least in part on a comparison of the current time and the scheduled starting time for the item of content. If the difference between the current time and the scheduled starting time satisfies a threshold (which could be 0 seconds, or some larger number (e.g., 0.5, 1, or 2 seconds) to enable buffering of the program prior to the start time) the corresponding playlist manifest may be automatically requested and provided to the video player.

At block 404, the playlist manifest request is received by the stitcher system.

At block 406, the location and length of interstitial pods within the requested primary content are identified. For example, the process may access a file or other metadata associated with the primary content that indicates the positions within the primary content for interstitial pods, wherein a given interstitial pod may have a specified length (e.g., 15 seconds, 30 seconds, 1 minute, 2 minutes, or other length). The interstitial pod may include an indication that a customized interstitial is to be played. The sections for the customized interstitial may be selected from alternative sections as discussed in greater detail elsewhere herein. In addition, if there is not enough information to select a section for a given insertion point based on selection criteria, a default section may be selected. In addition, a given section of the customized interstitial may optionally be common for all customized versions of the interstitial content.

At block 408, a playlist manifest is generated. For example, the manifest file may be an HLS .m3u8 or an MPEG DASH .mpd manifest file. The manifest file may include locators (URLs) for each primary content segment, and each interstitial segment and/or section (where optionally an interstitial section is equal to a segment length or an integer multiple thereof) in the desired playback order. The manifest file may include the entire playlist for the requested content or only a portion thereof.

At block 410, the manifest file is transmitted to the video player on the user device. At block 412, the client player receives the manifest file. At block 414, the client player requests content, including interstitial content segments/sections, in accordance with the playlist manifest. At block 416, the system receives content requests, including requests for interstitial content segments/sections from the client in sequential order. At block 418, the system causes the sections of customized interstitial content to be streamed in sequential order to the client player.

Although in the foregoing example, the identification and selection of sections for a customized content item, as well as the generation of a manifest, are performed at least partly in response to a request from a client on a user device, optionally these operations may be performed independent of and prior to such a client request. For example, the section selection and manifest generation may be performed independently of and prior to (and in anticipation of) a client request, and such selection and/or generated manifest may be stored in memory for later use in generating the customized content item and enabling the client to access such customized content item. Further, the customized interstitial may be streamed to the user device immediately before, during, or after the corresponding item of primary content. Optionally, rather than being streamed to and displayed by the user device between segments of primary content, the ancillary content, customized as disclosed herein, may be configured to be displayed as an overlay with respect to the primary content (e.g., a banner occupying a portion of the playback display area, while still enabling the primary content to be viewed in whole or part).

FIG. 5 illustrates an example process of selecting interstitial sections among a set of interstitials for insertion at respective insertion points. The process may optionally be executed in real time. At block 502, a request for interstitial content is received from a user client device. At block 504, user data is accessed from memory from a user record (e.g., using a user and/or device identifier to identify and access the user data record. For example, user data may include some or all of the following user information: a given user's demographics (e.g., gender identification, age, marital status, number of children, geolocation, type of home, education level, income level, etc.), a given user's historical viewing history (e.g., which channels and programs the user has watched, how often the user watches a given channel or program, how long a user watches a given program or channel, etc.), how new a given user is as a user of the streaming service, how frequently or how many episodes of a given program series the user has viewed, expressly specified or inferred user preferences (e.g., genre, program, subject matter, content and/or channel likes and/or dislikes; user specifications of channels to be blocked; user reminder instructions regarding a given program; user bookmarks of a given program; other user preferences discussed herein; and/or the like), user navigation history (e.g., whether the user navigated away from an item of primary or ancillary content directed to a given subject matter (e.g., a given genre, or if the ancillary content is an ad, a given brand or subject matter), fast forwarded through an item of primary or ancillary content directed to a given subject matter, skipped an item of primary or ancillary content directed to a given subject matter, replayed an item of primary or ancillary content directed to a given subject matter (e.g., travel, clothing, jewelry, electronics, food, medical products, etc.), interacted with an item of primary or ancillary content directed to a given subject matter (e.g., clicked on a link in an item of content, responded to a question or quiz posed by item of content, played a game provided by an item of content, and/or the like), and/or other criteria. Optionally, certain personally identifying data or other personal data is not used to enhance privacy.

At block 506, primary content metadata and/or other descriptive primary content data and/or metadata and/or other descriptive streaming channel data for the streaming channel via which the program content is streamed) may be accessed for primary content a user is currently viewing or about to use view (e.g., the next upcoming program) and/or for the corresponding channel. For example, the primary content and/or channel metadata may indicate an associated age-appropriateness rating or include content descriptions (e.g., suitable for children, suitable for ages 13 and up, suitable for ages 17 and up, suitable for ages 18 and up, contains violence, nudity, obscene language, mature situations, etc.), title, category, genre (e.g., preschool content, children, adventure, comedy, crime, mystery, police procedural, fantasy, historical, horror, romance, science fiction, animation, comic adaptation, etc.), viewer approval rating (e.g., 1, 2, 3, 4, or 5 stars), products or services depicted in the primary content, actors in the primary content, teams or players in the primary content (where the primary content may be a sports event), length, and/or other data.

At block 508, metadata associated with an item of a customizable item of interstitial content that is scheduled to be played and/or that has been requested, metadata associated with fixed sections of the item of interstitial content (where a given fixed section is included in each version of the customized item of interstitial content), metadata associated with sets of alternative sections of the item of interstitial content (e.g., where a set may include two or more sequential or non-sequential sections, such as a set including a first section and a last section of the item of interstitial content), and/or metadata associated with alternative sections of interstitial content for a given interstitial insertion point may be accessed from memory. By way of example, the metadata may include desired or prohibited viewer demographics (such as some or all of the demographic characteristics described herein), and/or other desired or prohibited user characteristics described herein (such as user subject matter interests, preferences, viewing history, navigation history, and/or other user data described herein).

At block 510, certain alternative sections for a given interstitial insertion point may be filtered out from consideration for being included in the customized interstitial for the user. For example, metadata associated with the primary content, metadata associated with the corresponding streaming channel, and/or metadata data associated with a given section in a set of alternative sections may indicate that a given section is inappropriate for inclusion in the item of customized interstitial content. By way of illustration, if the program is rated for preschool children, and a given section has more mature content or is intended to be directed to young single people, the given section may be filtered out as the section may not be suitable for preschool children or may not be of interest to a parent of preschool children. By way of yet further example, if a channel is directed to vegetarian or vegan lifestyles and a given section includes an image of someone eating beef, the given section may be filtered out as the given section may not be generally suitable for viewers of the channel.

At block 512, user data, interstitial metadata, interstitial section metadata for the interstitial sections that were not filtered out, primary content metadata, and/or channel metadata may be used to select the most appropriate section amongst alternative sections for a given interstitial insertion point. For example, a comparison between target demographics associated with a given section in a set of alternative sections (where each section in the set may have the same time length) and the user demographics may be utilized to identify which section in the set of alternative sections most closely matches the user's demographics, and that section may be selected for inclusion in the customized interstitial at the corresponding insertion point. Optionally, if a sufficiently close match is not found, a section designated as a default section may be used. For example, a default section may be appropriate for all ages or may include subject matter (e.g., a pet) of general interest or approval.

At block 514, a manifest is generated that includes locators for the selected sections.

A playlist (e.g., HLS or DASH playlist) may optionally include SCTE-35 markers. Optionally, the playlist does not include SCTE-35 marker indications, however, SCTE-35 markers may be inserted into a video stream. An SCTE-35 marker may be utilized to signal a primary content event or an ancillary content event (e.g., an advertisement insertion opportunity in a transport stream indicating that an ad can be inserted in the stream at the specified timestamp and if it is inserted it may have a duration of a specified number seconds). The SCTE-35 packets may be multiplexed with video and audio packets in the transport stream. The SCTE-35 packet may include a splice_info_section that may include a splice_insert to signal a splice event. When an out_of_network_indicator in the splice_info_section is set to 1, it signals switching from a program (primary content) to an advertisement (a cue out event). When the out_of_network_indicator is set to 0, it signals a switch back to the program (a cue in event). Optionally, even though an ad marker is present, a corresponding ad is not received or displayed.

Figure 6:
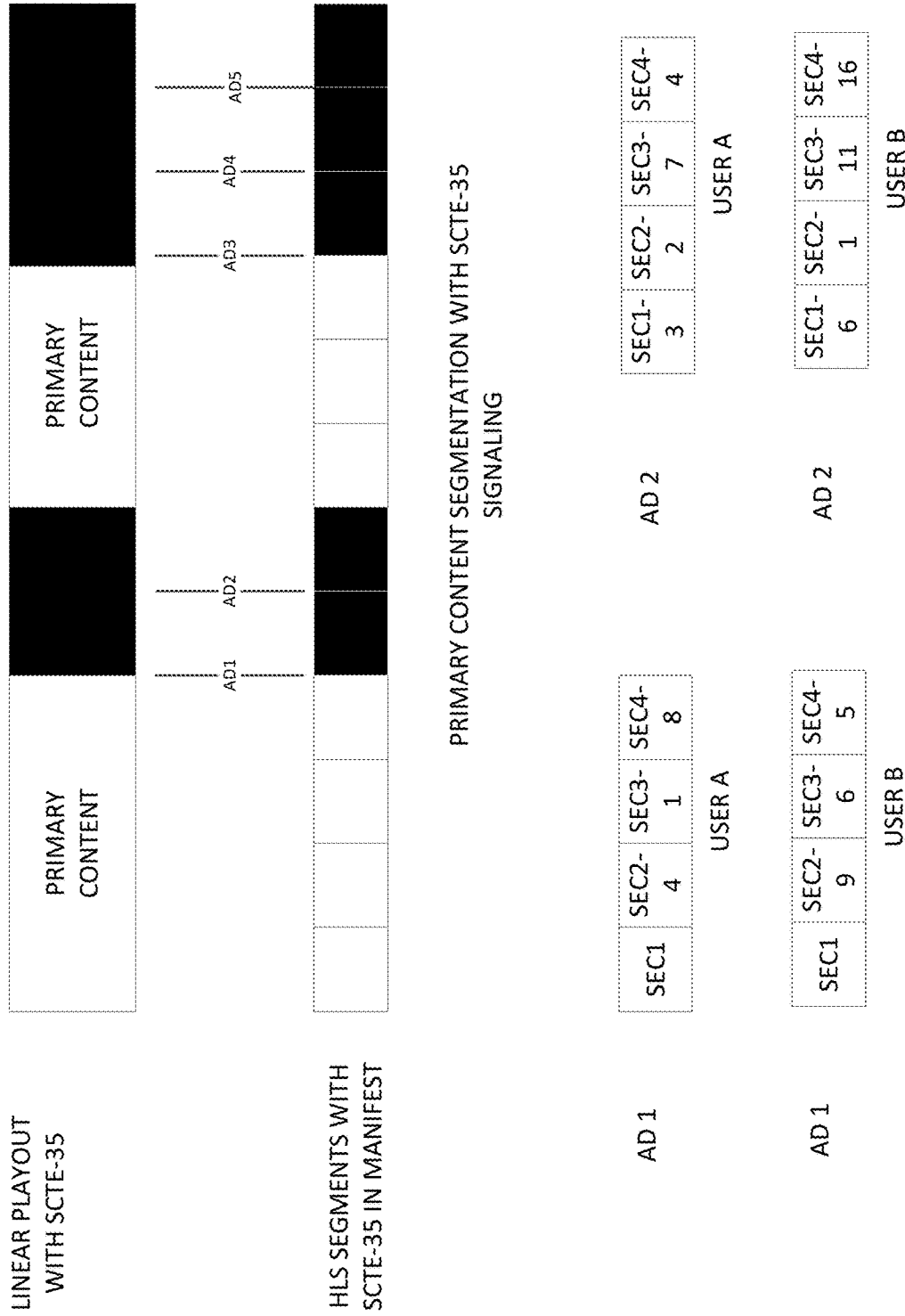
FIG. 6 illustrates example playouts and customized content.

FIG. 6 illustrates example linear playouts with SCTE markers in an HLS manifest for customized interstitial content for two users (although there may be more than two customized versions of interstitial content for more than two users). A linear playout of video content includes primary content (e.g., a video program, such as a real time, live video program) and interstitial content (AD1, AD2, AD3, AD4, AD5) positioned between primary content segments. The items of interstitial content correspond to respective SCTE-35 markers. Although an SCTE-35 marker may signal an opportunity to insert interstitial content (e.g., an ad), optionally, an item of interstitial content is not inserted although the marker is present.

In the example illustrated in FIG. 6, two interstitials, AD1 and AD2, are differently customized for User A and User B. In this example, the initial section for AD1 for both User A and User B is the same (SEC1). However, the second section of AD1 for User A uses alternative version 4 (SEC2-4), while the second section of AD1 for User B uses alternative version 9 (SEC2-4). Similarly, the third section of AD1 for User A uses alternative version 1 (SEC3-1), while the third section of AD1 for User B uses alternative version 6 (SEC3-6). The fourth section of AD1 for User A uses alternative version 8 (SEC4-8), while the fourth section of AD1 for User B uses alternative version 5 (SEC4-5).

Referring now to AD2, there are no alternative section versions that are common to both User A and User B. In this example, the initial section (Section 1) of AD2 for User A uses alternative version 3 (SEC1-3) and the initial section of AD2 for User B uses alternative version 6 (SEC1-6). The second section of AD2 for User A uses alternative version 2 (SEC2-2), while the second section of AD2 for User B uses alternative version 1 (SEC2-1). Similarly, the third section of AD2 for User A uses alternative version 1 (SEC3-1), while the third section of AD2 for User B uses alternative version 7 (SEC3-7). The fourth section of AD2 for User A uses alternative version 4 (SEC4-4), while the fourth section of AD2 for User B uses alternative version 16 (SEC4-16).

A first aspect relates of the disclosure related to methods and systems configured to detect that an item of streaming primary video content associated with a channel of scheduled streaming content is designated to be streamed to a device. Ancillary content is identified. Alternative versions of respective sections of the ancillary content are identified. Metadata corresponding to the alternative versions of ancillary content, metadata corresponding to the item of primary video content, and/or metadata corresponding to the channel are used in selecting a first section from among the alternative versions of a given section. The ancillary content, including the selected first section from among the alternative versions is streamed to the device immediately before, during, or immediately after the item of streaming video content. The alternative versions may be transcoded to generate multiple encoded iterations of respective alternative versions and the encoded versions are stored in a tree data structure.

A second aspect relates to a system, comprising: a computer device; a network interface; non-transitory computer readable memory having program instructions stored thereon that when executed by the computer device cause the system to perform operations comprising: detecting that a user device is receiving or will receive an item of streaming primary video content, wherein the streaming primary video content is optionally associated with a channel of scheduled streaming content comprising primary content items with specified start times and end times; identifying ancillary content that is to be transmitted to the user device immediately before, during, or immediately after the primary video content is rendered on the user device; identifying alternative versions of one or more sections of the ancillary content; accessing user data, metadata corresponding to the alternative versions of one or more sections of the ancillary content, metadata corresponding to the item of primary video content, and/or metadata corresponding to the channel of scheduled streaming content comprising primary content items with specified start times and end times; using the user data, metadata corresponding to the alternative versions of one or more sections of the ancillary content, metadata corresponding to the item of primary video content, and/or metadata corresponding to the channel of scheduled streaming content comprising primary content items with specified start times and end times, selecting a first section from among the alternative versions of a given section; causing the ancillary content, including the selected first section from among the alternative versions of a given section to be streamed, using the network interface, to the user device immediately before, during, or immediately after the item of streaming video content.

A third aspect relates to a system, comprising: a computer device; a network interface; non-transitory computer readable memory having program instructions stored thereon that when executed by the computer device cause the system to perform operations comprising: detecting that a user device is receiving or will receive an item of streaming primary video content, wherein the streaming primary video content is associated with a channel of scheduled streaming content comprising primary content items with specified start times and end times; identifying ancillary content that is to be transmitted to the user device immediately before, during, or immediately after the primary video content is rendered on the user device; identifying alternative versions of one or more sections of the ancillary content; accessing user data, metadata corresponding to the alternative versions of one or more sections of the ancillary content, metadata corresponding to the item of primary video content, and metadata corresponding to the channel of scheduled streaming content comprising primary content items with specified start times and end times; using the user data, metadata corresponding to the alternative versions of one or more sections of the ancillary content, metadata corresponding to the item of primary video content, and metadata corresponding to the channel of scheduled streaming content comprising primary content items with specified start times and end times, selecting a first section from among the alternative versions of a given section; causing the ancillary content, including the selected first section from among the alternative versions of a given section to be streamed, using the network interface, to the user device immediately before, during, or immediately after the item of streaming video content.

A fourth aspect relates to transcoding the alternative versions of one or more sections of the ancillary content into a plurality of different encodings storing the plurality of different encodings of the alternative versions of one or more sections of the ancillary content into a tree data structure. Optionally, the tree data structure may comprise a non-linear and hierarchical data structure comprising a collection of multiple nodes connected by edges.

A fifth aspect relates to generating a playlist manifest, the playlist manifest comprising a locator corresponding to the first section selected from among the alternative versions of the given section using the user data, the metadata corresponding to the alternative versions of one or more sections of the ancillary content, the metadata corresponding to the item of primary video content, and the metadata corresponding to the channel of scheduled streaming content;

A sixth aspect relates to transmitting to the user device the playlist manifest comprising a locator corresponding to the first section selected from among the alternative versions of the given section using the user data, the metadata corresponding to the alternative versions of one or more sections of the ancillary content, the metadata corresponding to the item of primary video content, and the metadata corresponding to the channel of scheduled streaming content; receiving a request from the user device comprising the locator corresponding to the first section selected from among the alternative versions of the given section; and at least partly in response to the request from the user device comprising the locator corresponding to the first section selected from among the alternative versions of the given section, causing the first section selected from among the alternative versions of the given section to the user device.

A seventh aspect relates to the system wherein using the user data, metadata corresponding to the alternative versions of one or more sections of the ancillary content, metadata corresponding to the item of primary video content, and metadata corresponding to the channel of scheduled streaming content comprising primary content items with specified start times and end times, to select the first section from among the alternative versions of the given section further comprising use genre data associated with the item of primary video content and/or associated with the channel of scheduled streaming content.

An eight aspect relates to filtering out one or more alternative versions from among the alternative versions of one or more sections of the ancillary content using metadata associated with the one or more alternative versions and metadata associated with the item of primary video content A ninth aspect relates to where the ancillary content comprises interstitial content.

A tenth aspect relates to where the ancillary content comprises content configured to overlay the item of primary video content.

An eleventh aspect relates to wherein the first section has a same length as an adaptive bitrates segment length.

A twelfth aspect relates to detecting that a second user device of a second user is receiving or will receive the item of streaming primary video content; accessing second user data, the metadata corresponding to the alternative versions of one or more sections of the ancillary content, the metadata corresponding to the item of primary video content, and the metadata corresponding to the channel of scheduled streaming content using the second user data, the metadata corresponding to the alternative versions of one or more sections of the ancillary content, the metadata corresponding to the item of primary video content, and the metadata corresponding to the channel of scheduled streaming content comprising primary content items with specified start times and end times, selecting a second section different than the first version from among the alternative versions of a given section; and causing the ancillary content, including the selected second section from among the alternative versions of a given section to be streamed using the network interface, to the second user device immediately before, during, or immediately after the item of streaming video content.

A thirteenth aspect relates to a computer implemented method, the method comprising: detecting, using a computer system, that a remote user device is receiving or will receive an item of streaming primary video content, wherein the streaming primary video content is associated with a channel of scheduled streaming content comprising primary content items with specified start times and end times; identifying, using the computer system, ancillary content that is to be transmitted to the remote user device immediately before, during, or immediately after the primary video content is rendered on the remote user device; identifying, using the computer system, alternative versions of one or more sections of the ancillary content; accessing, using the computer system, user data and metadata corresponding to the alternative versions of one or more sections of the ancillary content; using, by the computer system, the user data and metadata corresponding to the alternative versions of one or more sections of the ancillary content, selecting a first section from among the alternative versions of a given section; and causing the ancillary content, including the selected first section from among the alternative versions of a given section to be streamed to the remote user device immediately before, during, or immediately after the item of streaming video content.

A fourteenth aspect relates to detecting that a second remote user device of a second user is receiving or will receive the item of streaming primary video content; accessing second user data, the metadata corresponding to the alternative versions of one or more sections of the ancillary content, the metadata corresponding to the item of primary video content, and the metadata corresponding to the channel of scheduled streaming content; using the second user data and the metadata corresponding to the alternative versions of one or more sections of the ancillary content, selecting a second section different than the first version from among the alternative versions of a given section; and causing the ancillary content, including the selected second section from among the alternative versions of a given section to be streamed to the second remote user device immediately before, during, or immediately after the item of streaming video content.

A fifteenth aspect relates to transcoding the alternative versions of one or more sections of the ancillary content into a plurality of different encodings; and storing the plurality of different encodings of the alternative versions of one or more sections of the ancillary content into a tree data structure.

A sixteenth aspect relates to wherein the first section has a same length as an adaptive bitrates segment length.

A seventeenth aspect relates to generating a playlist manifest, the playlist manifest comprising a locator corresponding to the first section selected from among the alternative versions of the given section using the user data, the metadata corresponding to the alternative versions of one or more sections of the ancillary content, the metadata corresponding to the item of primary video content, and the metadata corresponding to the channel of scheduled streaming content;

An eighteen aspects relates to transmitting to the remote user device the playlist manifest comprising a locator corresponding to the first section selected from among the alternative versions of the given section using the user data, the metadata corresponding to the alternative versions of one or more sections of the ancillary content, the metadata corresponding to the item of primary video content, and the metadata corresponding to the channel of scheduled streaming content; receiving a request from the remote user device comprising the locator corresponding to the first section selected from among the alternative versions of the given section; and at least partly in response to the request from the remote user device comprising the locator corresponding to the first section selected from among the alternative versions of the given section, causing the first section selected from among the alternative versions of the given section to the remote user device.

A nineteenth aspect relates to wherein using the user data, metadata corresponding to the alternative versions of one or more sections of the ancillary content, metadata corresponding to the item of primary video content, and metadata corresponding to the channel of scheduled streaming content comprising primary content items with specified start times and end times, to select the first section from among the alternative versions of the given section further comprising use genre data associated with the item of primary video content and/or associated with the channel of scheduled streaming content.

A twentieth aspect relates to filtering out one or more alternative versions from among the alternative versions of one or more sections of the ancillary content using metadata associated with the one or more alternative versions and metadata associated with the item of primary video content.

A twenty first aspect relates to wherein the ancillary content comprises interstitial content.

A twenty second aspect relates to wherein the ancillary content comprises content configured to overlay the item of primary video content.

A twenty third aspect relates to wherein using the user data and the metadata corresponding to the alternative versions of one or more sections of the ancillary content to select the first section from among the alternative versions of the given section further comprises using metadata associated with the item of primary content to select the first section from among the alternative versions of a given section.

A twenty fourth aspect relates to a non-transitory computer readable memory having program instructions stored thereon that when executed by a computing device cause the computing device to perform operations comprising: detecting that a user device is receiving or will receive an item of streaming primary video content, wherein the streaming primary video content is associated with a channel of scheduled streaming content comprising primary content items with specified start times and end times; identifying ancillary content that is to be transmitted to the user device immediately before, during, or immediately after the primary video content is rendered on the user device; identifying alternative versions of one or more sections of the ancillary content; accessing user data, metadata corresponding to the alternative versions of one or more sections of the ancillary content, metadata corresponding to the item of primary video content, and/or metadata corresponding to the channel of scheduled streaming content comprising primary content items with specified start times and end times; using the user data, metadata corresponding to the alternative versions of one or more sections of the ancillary content, metadata corresponding to the item of primary video content, and/or the metadata corresponding to the channel of scheduled streaming content comprising primary content items with specified start times and end times, selecting a first section from among the alternative versions of a given section; and causing the ancillary content, including the selected first section from among the alternative versions of a given section to be streamed to the user device immediately before, during, or immediately after the item of streaming video content.

A twenty fifth aspect relates to detecting that a second user device of a second user is receiving or will receive the item of streaming primary video content; accessing second user data, the metadata corresponding to the alternative versions of one or more sections of the ancillary content, the metadata corresponding to the item of primary video content, and/or the metadata corresponding to the channel of scheduled streaming content; using the second user data, the metadata corresponding to the alternative versions of one or more sections of the ancillary content, the metadata corresponding to the item of primary video content, and/or the metadata corresponding to the channel of scheduled streaming content comprising primary content items with specified start times and end times, selecting a second section different than the first version from among the alternative versions of a given section; and causing the ancillary content, including the selected second section from among the alternative versions of a given section to be streamed to the second user device immediately before, during, or immediately after the item of streaming video content.

A twenty sixth aspect relates to transcoding the alternative versions of one or more sections of the ancillary content into a plurality of different encodings; and storing the plurality of different encodings of the alternative versions of one or more sections of the ancillary content into a tree data structure.

A twenty seventh aspect relates to wherein the first section has a same length as an adaptive bitrates segment length.

A twenty eighth aspect relates to generating a playlist manifest, the playlist manifest comprising a locator corresponding to the first section selected from among the alternative versions of the given section using the user data, the metadata corresponding to the alternative versions of one or more sections of the ancillary content, the metadata corresponding to the item of primary video content, and the metadata corresponding to the channel of scheduled streaming content; transmitting to the user device the playlist manifest comprising a locator corresponding to the first section selected from among the alternative versions of the given section using the user data, the metadata corresponding to the alternative versions of one or more sections of the ancillary content, the metadata corresponding to the item of primary video content, and the metadata corresponding to the channel of scheduled streaming content; receiving a request from the user device comprising the locator corresponding to the first section selected from among the alternative versions of the given section; and at least partly in response to the request from the user device comprising the locator corresponding to the first section selected from among the alternative versions of the given section, causing the first section selected from among the alternative versions of the given section to the user device.

A twenty ninth aspect relates to wherein using the user data, metadata corresponding to the alternative versions of one or more sections of the ancillary content, metadata corresponding to the item of primary video content, and metadata corresponding to the channel of scheduled streaming content comprising primary content items with specified start times and end times, to select the first section from among the alternative versions of the given section further comprising use genre data associated with the item of primary video content and/or associated with the channel of scheduled streaming content.

A thirtieth aspect relates to filtering out one or more alternative versions from among the alternative versions of one or more sections of the ancillary content using metadata associated with the one or more alternative versions and metadata associated with the item of primary video content A thirty first aspect relates to wherein the ancillary content comprises interstitial content.

A thirty second aspect relates to wherein the ancillary content comprises content configured to overlay the item of primary video content.

A thirty third aspect wherein using the user data, metadata corresponding to the alternative versions of one or more sections of the ancillary content, metadata corresponding to the item of primary video content, and/or the metadata corresponding to the channel of scheduled streaming content comprising primary content items with specified start times and end times, to select the first section from among the alternative versions of a given section further comprises using the user data, the metadata corresponding to the alternative versions of one or more sections of the ancillary content, and the metadata corresponding to the item of primary video content, to select the first section from among the alternative versions of a given section.

Thus, as described herein, systems and methods are disclosed that overcome the technical problems of providing customized content to large numbers of users (e.g., thousands, hundreds of thousands, or millions of users), while greatly reducing the amount of memory and processing power needed to provide such customization.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system, comprising:
   a computer device;
   a network interface;
   non-transitory computer readable memory having program instructions stored thereon that when executed by the computer device cause the system to perform operations comprising:
      detecting that a user device, remote from the system, is receiving or will receive an item of streaming primary video content from a first source;
      identifying a first item of ancillary content from a second source comprising a plurality of sections that is to be transmitted to the user device immediately before, during, or immediately after the item primary video content is rendered on the user device, wherein the first item of ancillary content is to be displayed between primary content segments from the first source;
      identifying alternative versions of one or more sections of the first item of ancillary content from the second source to be displayed between primary content segments from the first source;
      accessing:
         user data,
         metadata corresponding to the alternative versions of one or more sections of the first item of ancillary content,
         metadata corresponding to the item of primary video content comprising
         genre metadata associated with the item of streaming primary content, the genre metadata corresponding to a preschool genre, a children genre, an adventure genre, a comedy genre, a crime genre, a mystery genre, a police procedural genre, a fantasy genre, a historical genre, a horror genre, a romance genre, a science fiction genre, an animation genre, and/or a comic adaptation genre;
      using the user data, metadata corresponding to the alternative versions of one or more sections of the first item of ancillary content, metadata corresponding to the item of primary video content comprising genre metadata associated with the item of streaming primary content, selecting a first section from among the alternative versions of a given section of the first item of ancillary content from the second source to be displayed between primary content segments from the first source;
      generating a playlist manifest, the playlist manifest comprising a locator corresponding to the first section, comprising first content, selected from among the alternative versions of the given section of the first item of ancillary content, using the user data, the metadata corresponding to the alternative versions of one or more sections of the first item of ancillary content, the metadata corresponding to the item of primary video content comprising genre metadata associated with the item of streaming primary content;
      transmitting to the user device the playlist manifest comprising a locator corresponding to the first section selected from among the alternative versions of the given section using the user data, the metadata corresponding to the alternative versions of one or more sections of the first item of ancillary content, the metadata corresponding to the item of primary video content comprising genre metadata associated with the item of streaming primary content;
      receiving a request from the user device comprising the locator corresponding to the first section selected from among the alternative versions of the given section of the first item of ancillary content;
      at least partly in response to the request from the user device comprising the locator corresponding to the first section selected from among the alternative versions of the given section of the first item of ancillary content, and
      causing the first item of ancillary content, including the selected first section from among the alternative versions of a given section to be streamed using the network interface, to the user device immediately before, during, or immediately after the item of streaming video content, wherein the first item of ancillary content from the second source, including the selected first section from among the alternative versions, is to be displayed between primary content segments from the second source.

2. The system as defined in claim 1, the operations further comprising:
   detecting that a second user device of a second user is receiving or will receive the item of streaming primary video content;
   accessing second user data, the metadata corresponding to the alternative versions of one or more sections of the first item of ancillary content, the metadata corresponding to the item of primary video content, comprising genre metadata associated with the item of streaming primary content;
   using the second user data, the metadata corresponding to the alternative versions of one or more sections of the first item of ancillary content, the metadata corresponding to the item of primary video content, comprising genre metadata associated with the item of streaming primary content, selecting a second section different than the first version from among the alternative versions of a given section; and causing the first item of ancillary content, including the selected second section from among the alternative versions of a given section to be streamed using the network interface, to the second user device immediately before, during, or immediately after the item of streaming video content.

3. The system as defined in claim 1, the operations further comprising:

transcoding the alternative versions of one or more sections of the first item of ancillary content into a plurality of different encodings; and storing the plurality of different encodings of the alternative versions of one or more sections of the first item of ancillary content into a tree data structure.

4. The system as defined in claim 1, wherein the first section has a same length as an adaptive bitrates segment length.

5. The system as defined in claim 1, the operations further comprising filtering out one or more alternative versions from among the alternative versions of one or more sections of the first item of ancillary content using metadata associated with the one or more alternative versions and metadata associated with the item of primary video content.

6. The system as defined in claim 1, wherein the first item of ancillary content comprises interstitial content.

7. The system as defined in claim 1, wherein the first item of ancillary content comprises content configured to overlay the item of primary video content.

8. A computer implemented method, the method comprising:

detecting, using a computer system, that a remote user device is receiving or will receive an item of streaming primary video content from a first source;

identifying, using the computer system, a first item of ancillary content from a second source comprising a plurality of sections that is to be transmitted to the remote user device immediately before, during, or immediately after the item of streaming primary video content is rendered on the remote user device;

identifying, using the computer system, alternative versions of one or more sections of the first item of ancillary content from the second source;

accessing, using the computer system, user data, genre metadata associated with the item of streaming primary content, and metadata corresponding to the alternative versions of one or more sections of the first item of ancillary content from the second source;

using, by the computer system, the user data, genre metadata associated with the item of streaming primary content, and metadata corresponding to the alternative versions of one or more sections of the first item of ancillary content, selecting a first section from among the alternative versions of a given section of the first item of ancillary content, wherein using the user data, the genre metadata associated with the item of streaming primary content, and the metadata corresponding to the alternative versions of one or more sections of the first item of ancillary content to select the first section from among the alternative versions of a given section further comprises using metadata associated with the item of primary content to select the first section from among the alternative versions of a given section; and causing the first item of ancillary content, including the selected first section from among the alternative versions of a given section of the first item of ancillary content to be streamed to the remote user device immediately before, during, or immediately after the item of streaming video content.

9. The computer implemented method as defined in claim 8, the method further comprising:

detecting that a second remote user device of a second user is receiving or will receive the item of streaming primary video content;

accessing second user data and the metadata corresponding to the alternative versions of one or more sections of the first item of ancillary content;

using the second user data and the metadata corresponding to the alternative versions of one or more sections of the first item of ancillary content, selecting a second section different than the first version from among the alternative versions of a given section of the first item of ancillary content; and causing the first item of ancillary content, including the selected second section from among the alternative versions of a given section of the first item of ancillary content to be streamed to the second remote user device immediately before, during, or immediately after the item of streaming video content from the first source.

10. The computer implemented method as defined in claim 8, the method further comprising:

transcoding the alternative versions of one or more sections of the first item of ancillary content from the second source into a plurality of different encodings; and storing the plurality of different encodings of the alternative versions of one or more sections of the first item of ancillary content into a tree data structure.

11. The computer implemented method as defined in claim 8, wherein the first section has a same length as an adaptive bitrates segment length.

12. The computer implemented method as defined in claim 8, the method further comprising filtering out one or more alternative versions from among the alternative versions of one or more sections of the first item of ancillary content using metadata associated with the one or more alternative versions and metadata associated with the item of primary video content.

13. The computer implemented method as defined in claim 8, wherein the first item of ancillary content comprises interstitial content.

14. The computer implemented method as defined in claim 8, wherein the first item of ancillary content comprises content configured to overlay the item of primary video content.

15. A computer implemented method, the method comprising:

detecting, using a computer system, that a remote user device is receiving or will receive an item of streaming primary video content from a first source;

identifying, using the computer system, a first item of ancillary content from a second source comprising a plurality of sections that is to be transmitted to the remote user device immediately before, during, or immediately after the item of streaming primary video content is rendered on the remote user device;

identifying, using the computer system, alternative versions of one or more sections of the first item of ancillary content from the second source;

accessing, using the computer system, user data, genre metadata associated with the item of streaming primary content, and metadata corresponding to the alternative versions of one or more sections of the first item of ancillary content from the second source;

using, by the computer system, the user data, genre metadata associated with the item of streaming primary content, and metadata corresponding to the alternative versions of one or more sections of the first item of ancillary content, selecting a first section from among the alternative versions of a given section of the first item of ancillary content, generating a playlist manifest, the playlist manifest comprising a locator corresponding to the first section selected from among the alternative versions of the given section of the first item of ancillary content using the user data, the metadata comprising genre metadata associated with the item of streaming primary content, and the metadata corresponding to the alternative versions of one or more sections of the first item of ancillary content;

transmitting to the remote user device the playlist manifest comprising a locator corresponding to the first section selected from among the alternative versions of the given section using the user data, the metadata comprising genre metadata associated with the item of streaming primary content, and the metadata corresponding to the alternative versions of one or more sections of the first item of ancillary content;

receiving a request from the remote user device comprising the locator corresponding to the first section selected from among the alternative versions of the given section; and at least partly in response to the request from the remote user device comprising the locator corresponding to the first section selected from among the alternative versions of the given section of the first item of ancillary content, causing the first item of ancillary content, including the selected first section selected from among the alternative versions of a given section of the first item of ancillary content to be streamed to the remote user device immediately before, during, or immediately after the item of streaming video content.

16. Non-transitory computer readable memory having program instructions stored thereon that when executed by a computing device cause the computing device to perform operations comprising:

detecting that a user device is receiving or will receive an item of streaming primary video content;

identifying a first item of ancillary content, comprising a plurality of sections, that is to be transmitted to the user device immediately before, during, or immediately after the item of streaming primary video content is rendered on the user device;

identifying alternative versions of one or more sections of the first item of ancillary content;

accessing user data, metadata corresponding to the alternative versions of one or more sections of the first item of ancillary content, metadata comprising genre metadata corresponding to the item of primary video content;

using the user data, metadata corresponding to the alternative versions of one or more sections of the first item of ancillary content, and the metadata comprising genre metadata associated with the item of streaming primary content, selecting a first section from among the alternative versions of a given section of the first item of ancillary content, wherein using the user data, metadata corresponding to the alternative versions of one or more sections of the first item of ancillary content, the genre metadata associated with the item of streaming primary content, to select the first section from among the alternative versions of a given section further comprises using the user data, the metadata corresponding to the alternative versions of one or more sections of the first item of ancillary content, and the genre metadata associated with the item of streaming primary content, to select the first section from among the alternative versions of a given section; and causing the first item of ancillary content, including the selected first section from among the alternative versions of a given section of the first item of ancillary content to be streamed to the user device immediately before, during, or immediately after the item of streaming video content.

17. The non-transitory computer readable memory as defined in claim 16, the operations further comprising:

detecting that a second user device of a second user is receiving or will receive the item of streaming primary video content;

accessing second user data, the metadata corresponding to the alternative versions of one or more sections of the first item of ancillary content, and the genre metadata associated with the item of streaming primary content;

using the second user data, the metadata corresponding to the alternative versions of one or more sections of the first item of ancillary content, the genre associated with the item of streaming primary content, selecting a second section different than the first version from among the alternative versions of a given section of the first item of ancillary content; and causing the first item of ancillary content, including the selected second section from among the alternative versions of a given section of the first item of ancillary content to be streamed to the second user device immediately before, during, or immediately after the item of streaming video content.

18. The non-transitory computer readable memory as defined in claim 16, the operations further comprising:

transcoding the alternative versions of one or more sections of the first item of ancillary content into a plurality of different encodings; and storing the plurality of different encodings of the alternative versions of one or more sections of the first item of ancillary content into a tree data structure.

19. The non-transitory computer readable memory as defined in claim 16, wherein the first section of the first item of ancillary content has a same length as an adaptive bitrates segment length.

20. The non-transitory computer readable memory as defined in claim 16, the operations further comprising filtering out one or more alternative versions from among the alternative versions of one or more sections of the first item of ancillary content using metadata associated with the one or more alternative versions and metadata associated with the item of primary video content.

21. The non-transitory computer readable memory as defined in claim 16, wherein the first item of ancillary content comprises interstitial content.

22. The non-transitory computer readable memory as defined in claim 16, wherein the first item of ancillary content comprises content configured to overlay the item of primary video content.

23. Non-transitory computer readable memory having program instructions stored thereon that when executed by a computing device cause the computing device to perform operations comprising:

detecting that a user device is receiving or will receive an item of streaming primary video content;

identifying a first item of ancillary content, comprising a plurality of sections, that is to be transmitted to the user device immediately before, during, or immediately after the item of streaming primary video content is rendered on the user device;

identifying alternative versions of one or more sections of the first item of ancillary content;

accessing user data, metadata corresponding to the alternative versions of one or more sections of the first item of ancillary content, metadata comprising genre metadata corresponding to the item of primary video content;

using the user data, metadata corresponding to the alternative versions of one or more sections of the first item of ancillary content, and the metadata comprising genre metadata associated with the item of streaming primary content, selecting a first section from among the alternative versions of a given section of the first item of ancillary content;

generating a playlist manifest, the playlist manifest comprising a locator corresponding to the first section selected from among the alternative versions of the given section of the first item of ancillary content using the user data, the metadata corresponding to the alternative versions of one or more sections of the first item of ancillary content, the metadata corresponding to the item of primary video content, and the genre metadata associated with the item of streaming primary content;

transmitting to the user device the playlist manifest comprising a locator corresponding to the first section selected from among the alternative versions of the given section of the first item of ancillary content using the user data, the metadata corresponding to the alternative versions of one or more sections of the first item of ancillary content, the metadata corresponding to the item of primary video content, and the genre associated with the item of streaming primary content;

receiving a request from the user device comprising the locator corresponding to the first section selected from among the alternative versions of the given section; and at least partly in response to the request from the user device comprising the locator corresponding to the first section selected from among the alternative versions of the given section, causing the first item of ancillary content, including the selected first section selected from among the alternative versions of a given section to be streamed to the user device immediately before, during, or immediately after the item of streaming video content.

* * * * *

UNITED STATES PATENT AND TRADEMARK OFFICE
CERTIFICATE OF CORRECTION

PATENT NO. : 12,413,806 B2  
APPLICATION NO. : 18/748938  
DATED : September 9, 2025  
INVENTOR(S) : Riedl et al.

Page 1 of 1

It is certified that error appears in the above-identified patent and that said Letters Patent is hereby corrected as shown below:

In the Specification

Under Column no. 6, Line no. 6, replace ". . . $106_a$ that" with ". . . $106_n$ that".

Under Column no. 8, Line no. 13, replace "=The manifest" with "The manifest".

Under Column no. 9, Line no. 30, replace "data set," with "data set.".

Under Column no. 15, Line no. 8, replace "streaming content;" with "streaming content.".

Under Column no. 15, Line no. 40, replace "video content" with "video content.".

Under Column no. 16, Line no. 57, replace "streaming content;" with "streaming content.".

Under Column no. 18, Line no. 67, replace "video content" with "video content.".

In the Claims

Under Column no. 22, Claim 1, Line no. 37, replace "ancillary content;" with "ancillary content; and".

Under Column no. 22, Claim 1, Line no. 42, replace "content, and" with "content,".

Signed and Sealed this  
Twenty-first Day of October, 2025

John A. Squires  
*Director of the United States Patent and Trademark Office*